(12) United States Patent
Hejlsberg et al.

(10) Patent No.: US 7,730,467 B1
(45) Date of Patent: *Jun. 1, 2010

(54) OBJECT-ORIENTED PULL MODEL XML PARSER

(75) Inventors: Anders Hejlsberg, Seattle, WA (US); Christopher J. Lovett, Woodinville, WA (US); Matthew J. Warren, Redmond, WA (US); Chia-Hsun Chen, Redmond, WA (US); Mark W. Fussell, Sammamish, WA (US); Neetu Rajpal, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1383 days.

This patent is subject to a terminal disclaimer.

(21) Appl. No.: 11/046,979

(22) Filed: Jan. 31, 2005

Related U.S. Application Data

(62) Division of application No. 09/894,331, filed on Jun. 28, 2001.

(51) Int. Cl.
G06F 9/45 (2006.01)
(52) U.S. Cl. .................. 717/143; 717/142
(58) Field of Classification Search .......... 717/143
See application file for complete search history.

(56) References Cited

U.S. PATENT DOCUMENTS

| 6,083,276 | A | 7/2000 | Davidson et al. |
| 6,622,144 | B1 | 9/2003 | Rush, Jr. |
| 6,763,499 | B1 * | 7/2004 | Friedman et al. ........... 715/240 |
| 6,772,413 | B2 | 8/2004 | Kuznetsov |
| 7,272,628 | B1 * | 9/2007 | Pravetz et al. ............... 709/203 |
| 2002/0073399 | A1 | 6/2002 | Golden |
| 2002/0107871 | A1 * | 8/2002 | Wyzga et al. ............. 707/104.1 |
| 2002/0143521 | A1 * | 10/2002 | Call .............................. 704/1 |
| 2002/0147745 | A1 | 10/2002 | Houben et al. |
| 2003/0005410 | A1 | 1/2003 | Harless |
| 2003/0046317 | A1 | 3/2003 | Cseri et al. |
| 2003/0159112 | A1 | 8/2003 | Fry |

OTHER PUBLICATIONS

Ozen, B., Kilic, O., Altinel, M., and Dogac, A., May 2001. Highly personalized information delivery to mobile clients. In Proceedings of the 2nd ACM international Workshop on Data Engineering For Wireless and Mobile Access (Santa Barbara, California, United States). S. Banerjee, Ed. MobiDe '01. ACM, New York, NY, 35-42.*
Jianjun Chen, David J. DeWitt, Feng Tian, Yuan Wang, NiagaraCQ: a scalable continuous query system for Internet databases, May 2000, ACM, SIGMOD '00: Proceedings of the 2000 ACM SIGMOD international conference on Management of data, pp. 379-390.*

(Continued)

Primary Examiner—James Rutten
(74) Attorney, Agent, or Firm—Workman Nydegger

(57) ABSTRACT

A system and method for parsing XML is provided. The method includes associating an input stream with a pull model parser, accepting requests to selectively parse out XML items from the input stream and retrieving metadata information associated with the parsed out XML items. The method further includes checking the pulled XML item to determine whether it conforms to XML syntax and/or semantic standards and validating the pulled XML item to determine whether it conforms to a selected DTD.

20 Claims, 12 Drawing Sheets

OTHER PUBLICATIONS

"Extensible Markup Language (XML) 1.0", Feb. 1998, W3C, <http://www.w3.org/TR/1998/REC-xml-19980210.pdf>.*

Noga et al., "Lazy XML Processing" Nov. 9, 2002, ACM, DocEng '02, Symposium on Document Engineering.*

Slominski, "Design of a Pull and Push Parser System for Streaming XML", Apr. 2001, Indiana University, Technical Report TR-550.*

Clark, et al., SXP, http://sxp.sourceforge.net, Mar. 14, 2000, 4 pages.

Project: SXP—Simple XML Persistence: Summary, http://sourceforege.net/projects/sxp, Feb. 5, 2000, 2 pages.

Project: SXP—Simple XML Persistance: File List, http://sourceforge.net/project/showfiles.php?group_id=2280&package_id=2236If, Feb. 9, 2000, 2 pages.

SXP, http://sxp.sourceforge.net/sxp.h, Mar. 14, 2000, 16 pages.

SXP, http://sxp.sourceforge.net/sxp.cpp, Mar. 11, 2000 1 page.

SXP_Data, http://sxp.sourceforge.net/sxp_data.h, Mar. 11, 2000, 2 pages.

CONFIG, http://sxp.sourceforge.net/config.cpp, Mar. 13, 2000, 5 pages.

http://sxp.sourceforge.net/config.xml, date unknown, 1 page.

Graph, http://sxp.sourceforge.net/graph.cpp, Mar. 11, 2000, 6 pages.

http://sxp.sourceforge.net/graph.xml, date unknown, 2 pages.

Giuseppe Psaila, et al.; "Adding Semantics to XML", Second Workshop on Attribute Grammars and their Applications, WAGA99, Mar. 1999, 19 pages.

Office Action dated Feb. 24, 2005 cited in U.S. Appl. No. 09/894,331.

Office Action dated Aug. 10, 2005 cited in U.S. Appl. No. 09/894,331.

Office Action dated Apr. 24, 2006 cited in U.S. Appl. No. 09/894,331.

Office Action dated Jul. 6, 2007 cited in U.S. Appl. No. 09/894,331.

* cited by examiner

FIG. 7
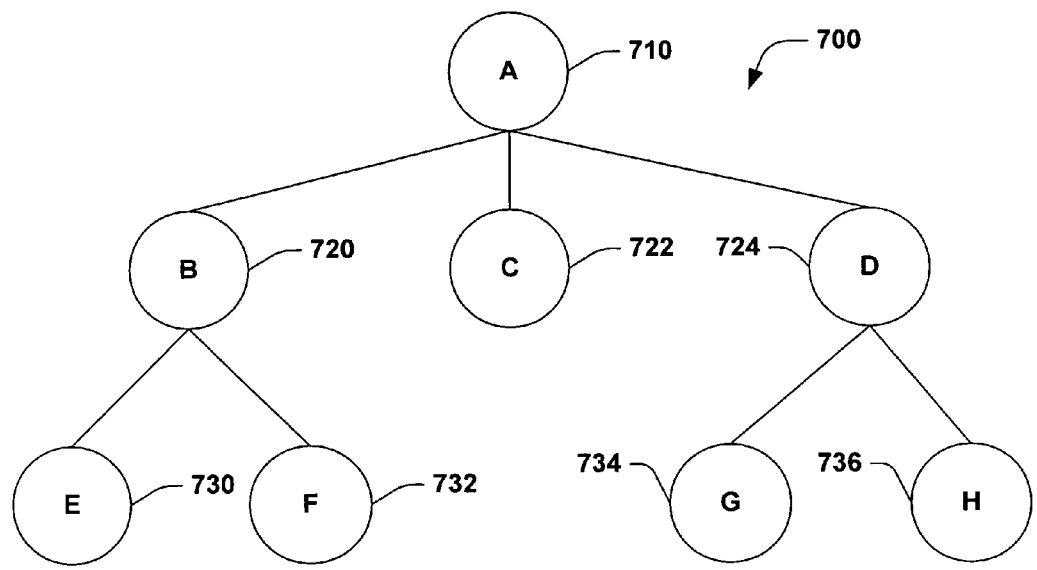
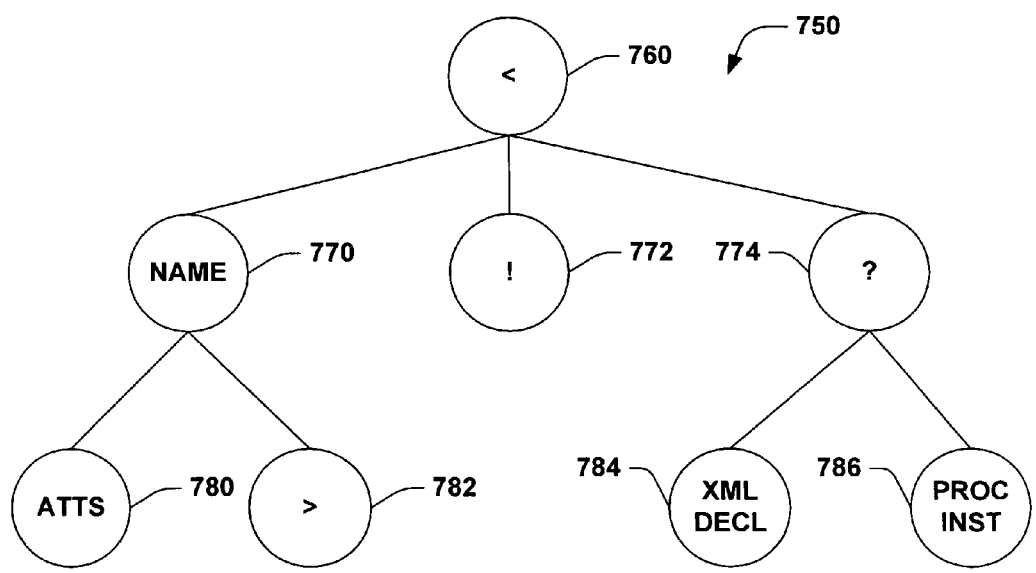

FIG. 9
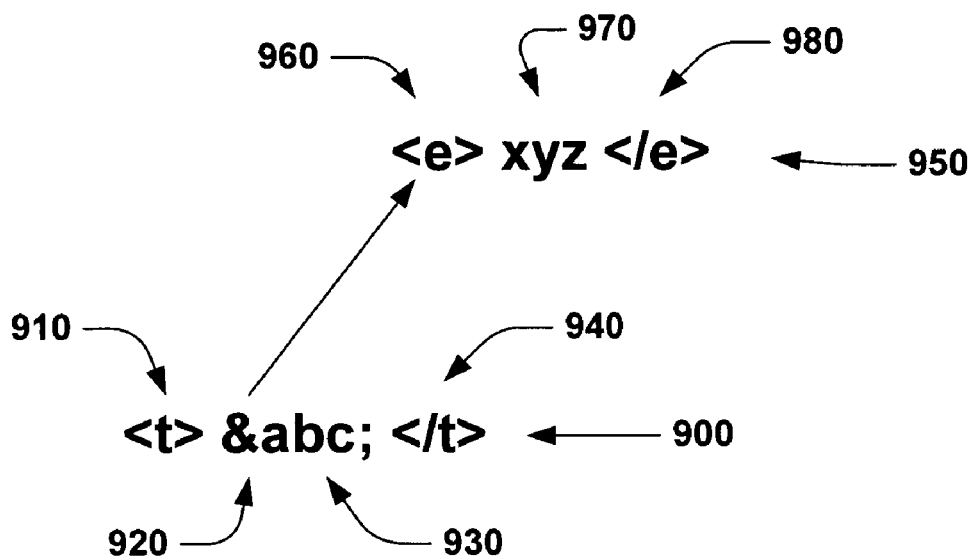
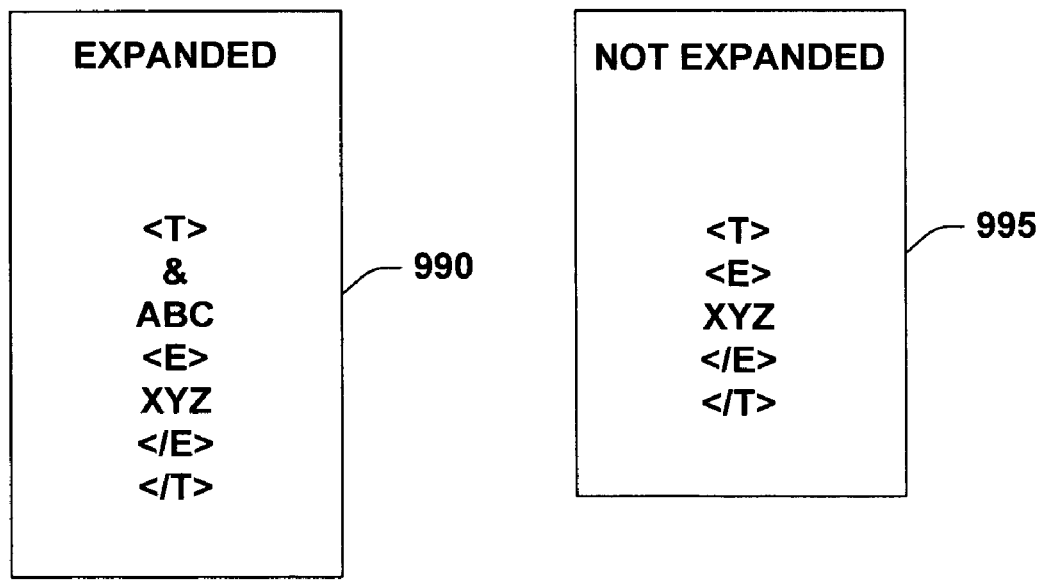

OBJECT-ORIENTED PULL MODEL XML PARSER

CROSS-REFERENCE TO RELATED APPLICATIONS

This application is a divisional of U.S. patent application Ser. No. 09/894,331, entitled "OBJECT-ORIENTED PULL MODEL XML PARSER", filed Jun. 28, 2001. The entirety of the above-noted application is incorporated herein by reference.

TECHNICAL FIELD

The present invention generally relates to parsing XML and more particularly to an object-oriented pull model XML parser.

BACKGROUND OF THE INVENTION

As XML has been more widely accepted, the need to parse XML has increased. Conventionally, there have been various methods to do this. One method is to build a tree of nodes, representing the XML data that was parsed. This is known as the Document Object Model (DOM) approach, which may consume significant memory and processing time, which consumption is exacerbated when processing large XML documents. Thus, "lower level" XML parsers developed and provided access to a stream of XML tokens that facilitated reducing processing times.

In the object oriented world a common model for low-level parsing is the push model parser (e.g., SAX) that parses an entire XML document and pushes substantially all of the parsed XML, associated parsing events and related event data to a parse requestor. This approach suffers from requiring a parse requestor to maintain a complicated state machine, the inability to concurrently interact with multiple XML sources and presenting a parse requestor with undesired XML tokens, which can complicate state machines associated with such parsers. Such state machine complexity may be exacerbated, for example, by the need to maintain state for dual capability parsers that split event level abstractions from element level abstractions.

In the non-object oriented world there are simple pull model parsers that may employ, for example, a single function (e.g., GetNextToken( )) which returns a struct containing information about that token. Such parsers also suffer from the problem of presenting the parse requestor with undesired XML tokens. Furthermore, the non-object oriented XML pull model parsers typically do not provide high-level input/output abstractions and, suffer from traditional problems associated with non object code. Thus, there remains a need for an improved object oriented XML parser.

XML is a W3C (World Wide Web Consortium) endorsed standard for document format that provides a generic syntax to mark up data with human-readable tags. Since XML does not have a fixed set of tags and elements, but rather allows users to define such tags, (so long as they conform to XML syntax), XML can be considered a meta-markup language for text documents. The markup that is allowed in a particular XML document can be recorded in a document type definition (DTD).

Data is stored in XML documents as strings of text that are surrounded by text markup. A particular unit of data and markup is conventionally referred to as an element. XML defines the syntax for the markup. A simple XML document appears below:

```
<?xml version="1.0"?>
<programmer grade="G7">
<firstname>ashton</firstname>
<lastname>annie</lastname>
<language>C</language>
<language>C#</language>
</programmer>
```

In this document, the name "ashton" is data (a.k.a. content), and the tags <firstname> and </firstname> are markup associated with that content. The example document is text and may be edited by conventional text editors and stored in locations including, but not limited to, a text file, a collection of text files, a database record and in memory.

XML documents can be treated as trees comprising a root node and one or more leaf nodes. In the example document, the root element is the programmer element. Furthermore, elements may contain parent elements and child elements. In the example document, the programmer element is a parent element that has four child elements: a firstname element, a lastname element, and two language elements. In the example document, the programmer element also has an attribute "grade". An attribute is a name/value pair that is associated with the start tag of an element. XML documents may contain XML entities including elements, tags, character data, attributes, entity references, CDATA sections, comments, processing instructions, and so on.

The W3C has codified XML's abstract data model in a specification called the XML Information Set (Infoset). The Infoset describes the logical structure of an XML document in terms of nodes (a.k.a. "information items") that have properties. Nodes in an XML tree have well-defined sets of properties that may be exposed. For example, an element node has properties including, but not limited to, a namespace name, a local name, a prefix, an unordered set of attributes, and an ordered list of children. The abstract description of an XML document standardizes information that is made available concerning XML documents. Thus, in addition to data that may be stored in an XML node, metadata concerning the node and the tree in which the node resides is available.

Programs that try to understand the contents of document like the sample XML document employ an XML parser to separate the document into individual XML tokens, elements, attributes and so on. Conventional push model parsers may perform well-formedness and validity checking on a parsed XML document. An XML document may be checked to determine whether it is well-formed (conforms to the XML specification) and to determine whether it is valid (conforms to a desired DTD). A DTD includes a list of elements, attributes and entities that an XML document can employ and the contexts in which they may and/or may not be employed. Thus, a DTD facilitates limiting the form of an XML document. A DTD may be located within an XML document, or an external reference to the DTD may be employed to locate the DTD with which an XML document is related. External references are common since it may be desirable to have more than one XML document conform to one DTD.

With XML being employed to store data for such a variety of applications, the need to parse XML for use with such variety of applications is common. Some conventional parsers may parse then write the more of the parsed output, events associated with the parsing (e.g., encountered elements, encountered attributes, encountered comments, encountered white space, etc.) and information (e.g., state, attributes) associated with the events that a user desires. Such over-parsing parsers suffer from several drawbacks, including, but not limited to, requiring the receiver of the parsed data to maintain a complicated state machine, transforming unneeded data, consuming excessive memory to hold undesired data, events and/or metadata, consuming excessive processor cycles to process such undesired data, events and/or metadata and limiting the flexibility with which the output destination can request parsed data.

As conventional parsers improve, more selective parsing, which reduces the amount of XML parsed, has appeared. However, such parsers may still present the user with non-configurable, non-selectable and thus irrelevant and/or unwanted data, events and/or metadata.

By way of illustration of a drawback of a conventional over-parsing parser, consider a user who desires to see the data associated with the <firstname> tags in the sample XML document listed above. Conventionally, the pieces of the document other than just the desired data would be loaded and parsed, and the user would be required to extract the relevant data from the parsed data. Again, excessive memory and processor cycles have been employed in parsing irrelevant data.

Conventional parsers typically interact with event driven user programs that receive event notifications from the parser along with a set of data concerning the event. One drawback with such conventional systems is that event notifications may require unnecessary processing by a user program that may only be interested in a subset of events. Furthermore, simple pull model parsers may only provide a single pull method that will non-selectively provide the next XML token in an XML data source, regardless of whether the user desires such token, which forces the user to handle an irrelevant (to the user) token, event, data and/or metadata. Further still, user programs that interact with such event producing parsers may be required to maintain complicated state machines in order to interact with the conventional parser.

Since conventional parsers typically interact with event driven user programs that are required to maintain complicated state machines concerning the progress of the parsing, it is typical that such conventional parsers only interact with a single XML data source. Thus, flexibility in processing parsed data is limited in such conventional systems.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides a configurable, object-oriented pull model XML parser that exposes an interface that facilitates abstracting input sources. The pull model parser facilitates incrementally and selectively parsing data from an XML document, mitigating over-parsing problems associated with conventional systems (e.g., excessive memory and/or processing requirement). Because the pull model parser is object-oriented and exposes an interface, the present invention simplifies interactions with other programs, processes, objects and the like (e.g., a navigator) that in turn facilitate providing high-level abstractions of XML data sources. For example, a navigator, that is not part of the present invention, facilitates selectively pulling an XML node from an XML document. Such a navigator may expose XML nodes as a stream of nodes which facilitates the present invention employing a scanner adapted to navigate a virtual node over a stream of nodes.

Since XML may contain external entity references, the present invention is adapted to selectively expand such external references, providing flexibility advantages concerning document location and entity expansion over conventional systems. Furthermore, since an XML document may contain invalid and/or ill-formed XML, one example of the present invention is adapted to determine whether the pulled XML is well-formed and/or valid, where well-formedness may concern adherence to W3C (World Wide Web Consortium) standards and where validity concerns adherence to one or more user defined formats. Such formats can be stored in DTDs (Document Type Declaration) and/or schema.

The parser associated with the present invention facilitates parsing data as a virtual node is moved over a stream of XML data. Pulling nodes from such an input stream provides advantages over conventional systems. By way of illustration and not limitation, if a user does not desire to parse certain nodes in an input stream, then the virtual node can pass over such nodes without presenting them for parsing. Thus, the parser and/or user program can interact with less data. Such virtual node navigation also simplifies conventional processes like stopping parsing when a certain point in the input stream is reached and employing a pipeline architecture, where partial results from the parser are fed forward to other components as they are parsed, which facilitates multiprocessing in a parsing environment.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

Prior Art

FIG. 7 illustrates a generic state machine and an example state machine employed by a pull model parser, in accordance with an aspect of the present invention.

FIG. 9 illustrates the result of parsing an XML document that contains an external entity reference in two modes: an entity expanding mode and an entity non-expanding mode, in accordance with an aspect of the present invention.

DETAILED DESCRIPTION OF THE INVENTION

Figure 1:
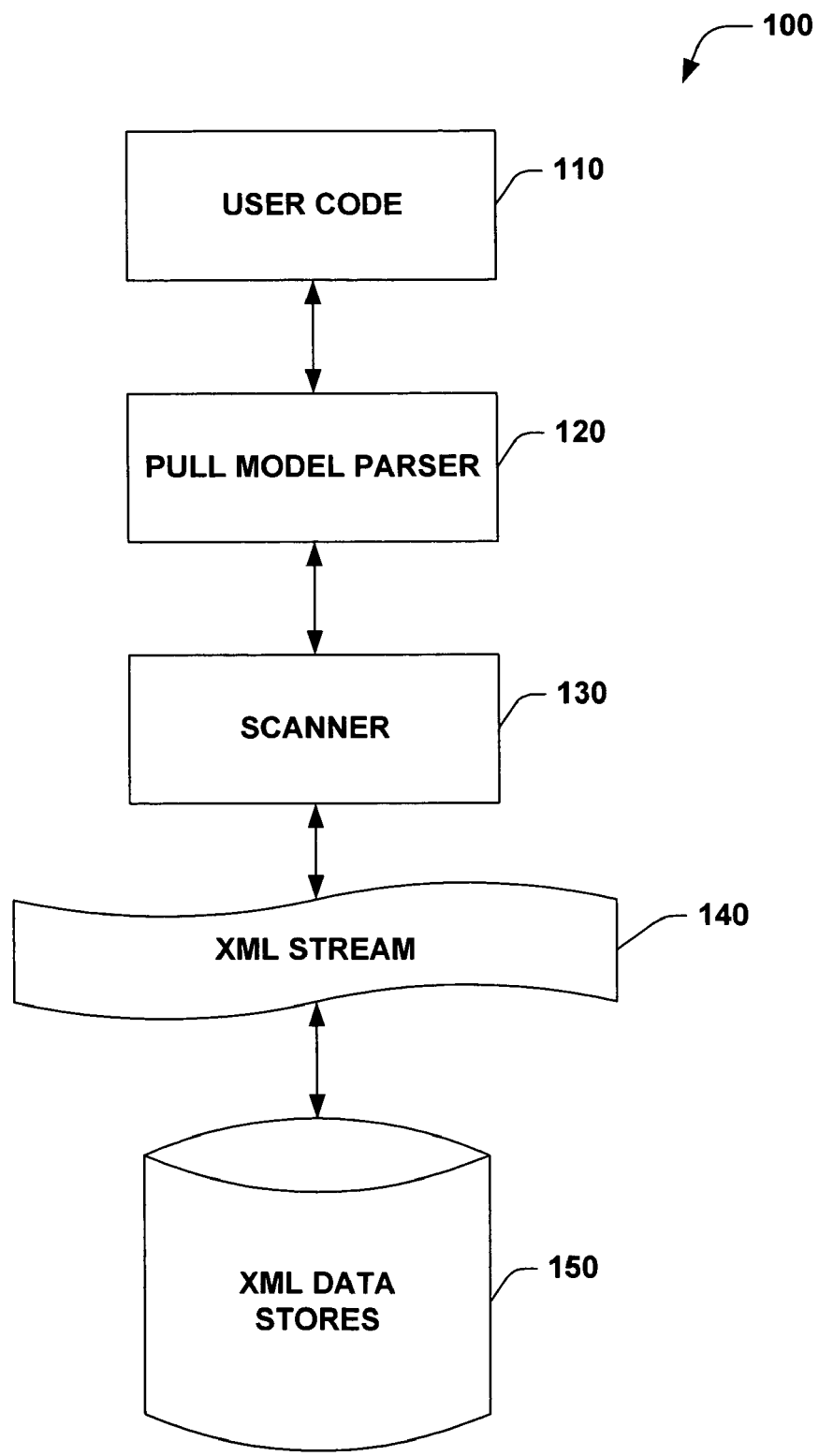
FIG. 1 is a schematic block diagram illustrating a system for parsing XML items using a pull model parser, in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component.

Concerning interfaces, classes not related by inheritance may, nevertheless, share common functionality. For example, many classes may contain methods for saving their state to and from permanent storage. For this purpose, classes not related by inheritance may support interfaces allowing programmers to code for the classes' shared behavior based on their shared interface type and not their exact types. Thus, as used in this application, the term "interface" refers to a partial specification of a type. It is a contract that binds implementers to provide implementations of the methods contained in the interface. Object types may support many interface types, and many different object types would normally support an interface type. By definition, an interface type can never be an object type or an event type. Interfaces may extend other interface types. Thus, an interface may contain methods (both class and instance), static fields, properties and events. However, unlike an object, an interface cannot obtain instance fields.

It is to be appreciated that various aspects of the present invention may employ technologies associated with facilitating unconstrained optimization and/or minimization of error costs. Thus, non-linear training systems/methodologies (e.g., back propagation, Bayesian, fuzzy sets, non-linear regression, or other neural networking paradigms including mixture of experts, cerebella model arithmetic computer (CMACS), radial basis functions, directed search networks and function link networks may be employed.

Referring initially to FIG. 1, a system 100 for parsing XML is illustrated. The system 100 includes a pull model parser 120 that interacts with a scanner 130 that is adapted to parse an XML stream 140. As the scanner 130 scans the stream 140, the scanner 130 locates an XML token associated with an XML item. The scanner 130 can then selectively determine whether to present the XML token and/or an event associated with the token to the pull model parser 120 based, at least in part, on instructions from the pull model parser 120 concerning the type(s) of XML tokens in which the pull model parser 120 is interested.

While the scanner 130 and the pull model parser 120 are illustrated as separate components it is to be appreciated that the scanner 130 and the pull model parser 120 may be a single component. Furthermore, it is to be appreciated that the scanner 130 and/or the pull model parser 120 may be objects that expose one or more interfaces. In one example of the present invention, the stream 140 may be a stream of XML nodes, and thus the scanner 130 may be adapted to selectively present XML nodes to the pull model parser 120. However, it is to be appreciated that the scanner 130 may parse out XML items including, but not limited to, tokens, start tokens, end tokens, markup, content, entity references, external references, elements, tags, character data, attributes, CDATA sections, comments and processing instructions.

The XML data stored in an XML data store 150 is presented to the scanner 130 as a stream 140, which facilitates the pull model parser 120 selectively pulling items from the XML data store 150. Thus, with selective pulling facilitated, excessive memory and/or excessive processing cycle problems associated with conventional systems are mitigated. For example, the XML data store 150 may store a one hundred megabyte XML document associated with car sales. The XML document may be formed, for example, from one hundred one megabyte records, each of which has a number of elements concerning cars that were sold from various dealerships. While an abundance of information is available, the user code 110 may only be interested in a certain model of car sold from a certain subset of car dealerships. Thus, the pull model parser 120 may be employed, in connection with the scanner 130, to selectively retrieve relevant XML items from the stream 140. The selectively retrieved XML items may only consume ten kilobytes each and a total of one megabyte of memory. Since irrelevant XML items are not pulled from the stream 140 associated with the XML data store 150, the system 100 employs less memory than conventional systems and parses less items than conventional systems.

Figure 2:
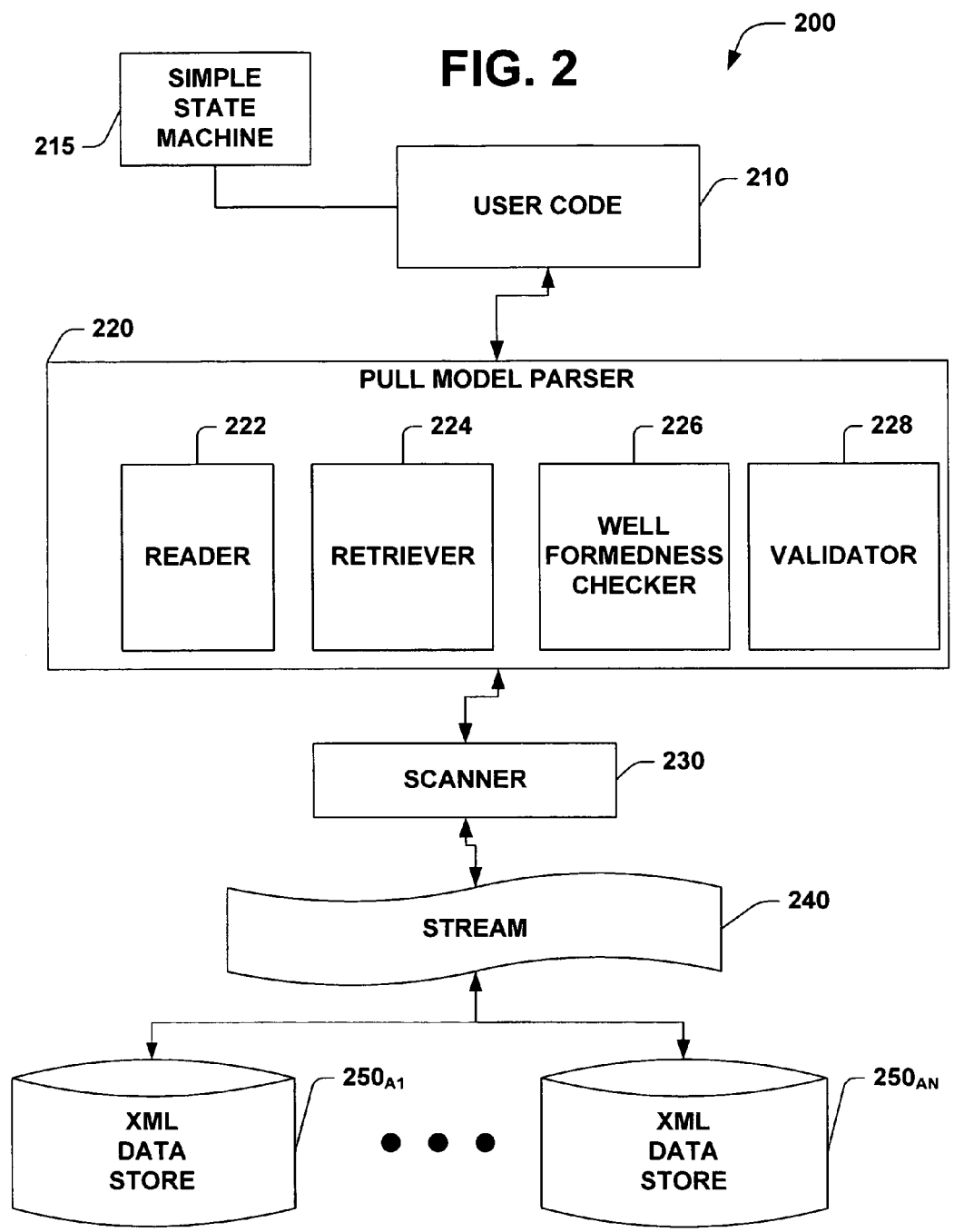
FIG. 2 is a schematic block diagram of an exemplary parser and its component parts, in accordance with an aspect of the present invention.

FIG. 2 is a schematic block diagram of a system 200 for pull model parsing of XML. The system 200 includes a pull-model parser 220 that can be employed to selectively pull and parse XML items. User code 210 that maintains a simple state machine 215 can request parsed XML items from the pull model parser 220. As opposed to conventional push parsers where the user code 210 would be required to maintain a complex state machine (due in part to receiving substantially all of the parsed XML, events associated with parsing substantially all the XML and data related to events associated with parsing the XML) the present invention facilitates maintaining a more simple state machine 215. Such a simpler state machine 215 can be maintained because the pull model parser 220 can be employed to selectively pull desired XML from the data stores 250 and thus reduce the number of items, events and related data presented to the user code 210 by the pull model parser 220. Furthermore, in contrast to conventional pull model parsers that present extraneous data (e.g., undesired, irrelevant to the user) XML, substantially all of the events, data and/or metadata associated with the extraneous data, the present invention facilitates selectively pulling XML, and/or the related metadata thus reducing the amount and/or type of data and/or events presented to a parse user. Thus the state machine 215 may be simplified as compared to conventional systems.

In one example of the system 200, the pull model parser includes a reader 222 that can interact with a scanner 230 to facilitate selectively pulling XML items from XML data stores (e.g., data store $250_{A1}$ through data store $250_{AN}$, collectively the data stores 250) via a stream 240. The reader 222 may be an object that exposes one or more interfaces, which simplifies integrating the reader 222 into the pull model parser 220 and which simplifies customizing components and/or objects that interact with the reader 222. The data stores 250 can include, but are not limited to, files, databases, pipes, streams, memory and queries. Since the present invention facilitates selective pulling, which facilitates maintaining a simpler state machine 215, one advantage of the present invention is that the user code 210 can interact with the pull model parser 220 to pull XML items from more than one of the data stores 250. Thus, more flexible parsing is facilitated.

The user code 210 may only be interested in a subset of the available XML items. Thus, the user code 210 supplies the pull model parser 220 with information concerning XML items in which it is interested and in what contexts it is interested in those XML items. Thus, the user code 210 is presented fewer parsed items, reducing memory requirements. Furthermore, the user code 210 may receive fewer events and be able to maintain a simpler state machine 215. The pull model parser 220 can forward to the scanner 230 information concerning XML items in which the user code 210 is interested. The scanner 230 can therefore selectively parse out relevant XML items and pass fewer XML items to the pull model parser 220.

In one example of the present invention, the pull model parser 220 includes a well-formedness checker 226 that can be employed to determine whether a pulled XML item is well-formed. Well-formedness may depend, for example, on adherence to W3C standards concerning XML syntax and/or semantics. In another example of the present invention, the pull model parser 220 includes a validator 228 that can be employed to determine whether the pulled XML item is valid. Validity may depend, for example, on conformance with items including but not limited to a DTD, a schema and/or an XDR. The concepts of well-formedness and validity are well known in the art and thus discussion of these concepts is omitted for the sake of brevity. Although such concepts are known in the art, it is to be appreciated that the present invention facilitates determining well-formedness and/or validity in a pull-model parser 220 as opposed to such determinations in conventional push-model parsers. While the reader 222, the retriever 224, the well-formedness checker 226 and the validator 228 are illustrated as separate components, it is to be appreciated that the reader 222, the retriever 224, the well-formedness checker 226 and the validator 228 may be implemented in one or more standalone and/or co-operating components and that such components may be implemented in hardware and/or software. The checker 226 and/or the validator 228 may also be objects that expose one or more interfaces and which, therefore, simplify integrating such objects into a pull model parser and/or customizing the behavior of such objects in derived classes. Furthermore, since the reader 222, the retriever 224, the checker 226 and/or the validator 228 can be objects, interacting with other objects that provide abstractions to XML data sources is simplified (e.g., the node navigator).

Since an XML document can be represented as a tree of nodes, in one example of the present invention, the stream 240 is a stream of nodes and the scanner 230 can be adapted to facilitate navigating a virtual node in a stream of XML nodes. (Navigating the virtual node is illustrated in association with FIG. 5). Thus, the pull model parser 220 pulls and parses XML nodes from the stream 240, which further facilitates mitigating problems associated with conventional push-model parsers.

By way of illustration and not limitation, the user code 210 may only be interested in a subset of XML nodes that are available from the XML data stores $250_{AN}$. Furthermore, within the subset of XML nodes, a subsequent XML node in which the user code 210 is interested may depend on a previous XML node that is pulled and parsed from the stream 240. Thus, the ability to navigate within the stream 240 facilitates deferring pull decisions until after a selectively pulled node has been parsed by the pull model parser 220 and a decision concerning the parsed node has been made by the user code 210. Therefore, performance advantages, reductions in memory requirements and reduction in processing cycles are achieved over conventional push model parsers that push substantially all of the XML nodes to a parser for parsing.

By way of further illustration, the user code 210 may be interested in XML nodes from a subset of the data sources 250. Conventionally, a parser would be required to parse substantially all of the XML in each of the data sources 250 and store substantially all of the parsed data before the user code 210 could attempt to integrate data from the subset of the data sources 250. But the present invention facilitates identifying a data source from which to pull a subsequent XML node based, at least in part, on pulling and parsing of a previous node by the pull model parser 220 and processing related to the pulled/parsed node by the user code 210. Thus, after processing a pulled XML node from a first data source, the user code 210 may determine that a related XML node from a second data source and a further related XML node from a third data source are desired. Therefore, the pull model parser 220 may, via the scanner 230, selectively pull the desired nodes from the stream 240, reducing memory requirements and processor cycle requirements.

Since XML entities may include entity references and/or external references, in one example of the present invention, the scanner 230 is further adapted to resolve an external reference in the stream 240. Processing associated with resolving a reference is illustrated in association with FIGS. 4 and 9.

The pull model parser 220 may also include a retriever 224, which may be an object, that is adapted to expose data model and/or Infoset information associated with a pulled XML item. As opposed to a conventional push model parser where substantially all the metadata associated with an XML item is pushed onto a parse requester, which requires the parse requester to maintain a more complicated state machine, the present invention facilitates selectively retrieving metadata associated with a pulled XML item. Furthermore, as opposed to simple pull model parsers that automatically forward a token and a related event data structure populated with data and/or metadata associated with the token, the present invention can be programmed to ignore selected tokens, which reduces the type and/or number of tokens, events and/or data structures with which the present invention and users of the present invention interact. The metadata can include, but is not limited to, a namespace name, a local name, a prefix, an unordered set of attributes, and an ordered list of children. Thus, the present invention further facilitates reducing memory requirements for parsing XML via the selective pulling of metadata related to selectively pulled XML items. In one example of the present invention, the retriever 224 is adapted to retrieve metadata identified in one or more W3C standards.

A pull model parser 220 can be employed in a variety of contexts. Interacting with these various contexts is facilitated by the present invention exposing one or more object-oriented interfaces. Thus, example pull model parsers include, but are not limited to, an XML text reader, an XML validating reader, an XML node reader and an Xslt reader. An XML text reader can be employed to read character streams and to move through a file, for example. An XML validating reader can be employed in connection with an XML text reader and, in addition to reading character streams and moving through a file, can access one or more DTDs to validate the text that is read. An XML node reader can be employed to read a node stream. Thus, the XML node reader is adapted to move through a document node tree and to expose it to a pull model parser as a stream.

One example pull model parser 220 is an XML reader class object. The following definition partially illustrates one example XML reader.

Public Instance Properties

AttributeCount The number of attributes on the current node.

BaseURI Gets the base URI of the current node.

Depth Gets the depth of the current node in the XML element stack.

EOF Gets a value indicating whether a reader is positioned at the end of a stream.

HasAttributes Gets a value indicating whether current node has attributes.

HasValue Gets a value indicating whether Value has a value to return.

IsDefault Gets a value indicating whether the current node is an attribute that was generated from the default value defined in the DTD or schema.

IsEmptyTag Gets a value indicating whether the current node is an empty element (for example, <MyElement/>).

Item Overloaded. Gets the value of the attribute.

LocalName Gets the name of the current node without the namespace prefix.

Name Gets the name of the current node, including the namespace prefix.

NamespaceURI Gets the namespace URN (as defined in the W3C Namespace Specification) of the current namespace scope.

NameTable Gets table name associated with this implementation.

NodeType Gets the type of the current node.

Prefix Gets namespace prefix associated with current node.

QuoteChar Gets quotation character used to enclose value of node.

ReadState Returns the read state of the stream.

Value Gets the text value of the current node.

XmlLang Gets the current xml:lang scope.

XmlSpace Gets the current xml:space scope.

Public Instance Methods

Close Close stream, change ReadState to Closed, reset properties.

Equals Determines whether the specified Object is the same instance as the current Object.

GetAttribute Overloaded. Gets the value of an attribute.

GetHashCode Serves as a hash function for a particular type, suitable for use in hashing algorithms and data structures like a hash table.

GetType Gets the Type of the Object.

IsStartElement Overloaded. Tests if the current content node is a start tag.

LookupNamespace Resolves a namespace prefix in the current element's scope.

MoveToAttribute Overloaded. Moves to specified attribute.

MoveToContent Checks whether the current node is a content (non-white space text, CDATA, Element, End Tag, Entity Reference, Character Entity, or End Entity) node. If the node is not a content node, then the method skips ahead to the next content node or end of file. Skips over nodes of type Processing Instruction, Document Type, Comment, White space, or SignificantWhitespace.

MoveToElement Moves to element that contains current attribute node.

MoveToFirstAttribute Moves to the first attribute.

MoveToNextAttribute Moves to the next attribute.

Read Reads the next node from the stream.

ReadAttributeValue Parses the attribute value into one or more Text and/or Entity Reference node types.

ReadEndElement Checks that the current content node is an end tag and advances the reader to the next node.

ReadInnerXml Reads content (including markup) as a string.

ReadStartElement Overloaded. Checks that the current node is an element and advances the reader to the next node.

ResolveEntity Resolves the entity reference for nodes of NodeType Entity Reference.

Skip Skips the current element.

ToString Returns a String that represents the current Object.

One example pull model parser 220 is an XML node reader. The example XML node reader is a pull model parser that can read XML from an XML document and/or from an XML node. The following partial class definition illustrates properties and members associated with one example XML node reader.

Public Instance Properties

AttributeCount Gets number of attributes on current node.

BaseURI Gets base URI of current node.

Depth Gets depth of current node in XML element stack.

EOF Gets a value indicating whether the reader is positioned at the end of a stream.

HasAttributes Gets a value indicating whether the current node has attributes.

HasValue Gets a value indicating whether Value has a value to return.

IsDefault Gets a value indicating whether the current node is an attribute that was generated from the default value defined in the DTD or schema.

IsEmptyTag Gets a value indicating whether the current node is an empty element (for example, <MyElement/>).

Item Overloaded. Gets the value of the attribute

LocalName Gets the name of the current node without the namespace prefix.

Name Gets the name of the current node, including the namespace prefix.

NamespaceURI Gets the namespace URN (as defined in the W3C Namespace Specification) of the current namespace scope.

NameTable Gets a table associated with this implementation.

NodeType Gets the type of the current node.

Prefix Gets namespace prefix associated with current node.

QuoteChar Gets the quotation mark character used to enclose the value of an attribute node.

ReadState Gets the read state of the stream.

Value Gets the text value of the current node.

XmlLang Gets the current xml:lang scope.

XmlSpace Gets the current xml:space scope.

Public Instance Methods

Close Close stream, change ReadState, reset properties.

Equals Determines whether the specified Object is the same instance as the current Object.

GetAttribute Overloaded. Gets the value of an attribute.

GetHashCode Serves as a hash function for a particular type, suitable for use in hashing algorithms and data structures like a hash table.

IsStartElement Overloaded. Tests if the current content node is a start tag.

LookupNamespace Resolves a namespace prefix in the current element's scope.

MoveToAttribute Overloaded. Move to the specified attribute. Facilitates random access to attributes.

MoveToContent Checks whether the current node is a content (non-white space text, CDATA, Element, End Tag, Entity Reference, Character Entity, or End Entity) node.

MoveToElement Moves to the element that contains the current attribute node.

MoveToFirstAttribute Moves to the first attribute.

MoveToNextAttribute Moves to the next attribute.

Read Reads the next node from the stream.

ReadAttributeValue Parses the attribute value into one or more Text and/or Entity Reference node types.

ReadEndElement Checks that the current content node is an end tag and advances the reader to the next node.

ReadInnerXml Reads the content (including markup) as a string.

ReadStartElement Overloaded. Checks that the current node is an element and advances the reader to the next node.

ReadString Reads the contents of an element as a string.

ReadTime Reads the value and returns it as a DateTime.

ReadTimeSpan Reads the value and returns it as a TimeSpan.

ResolveEntity Resolves the entity reference for nodes of NodeType Entity Reference.

Skip Skips the current element.

Thus, the two examples illustrate one of the benefits of exposing an object-oriented interface, the ability to derive related classes and thus interact via high-level input/output abstractions with a variety of contexts.

Figure 3:
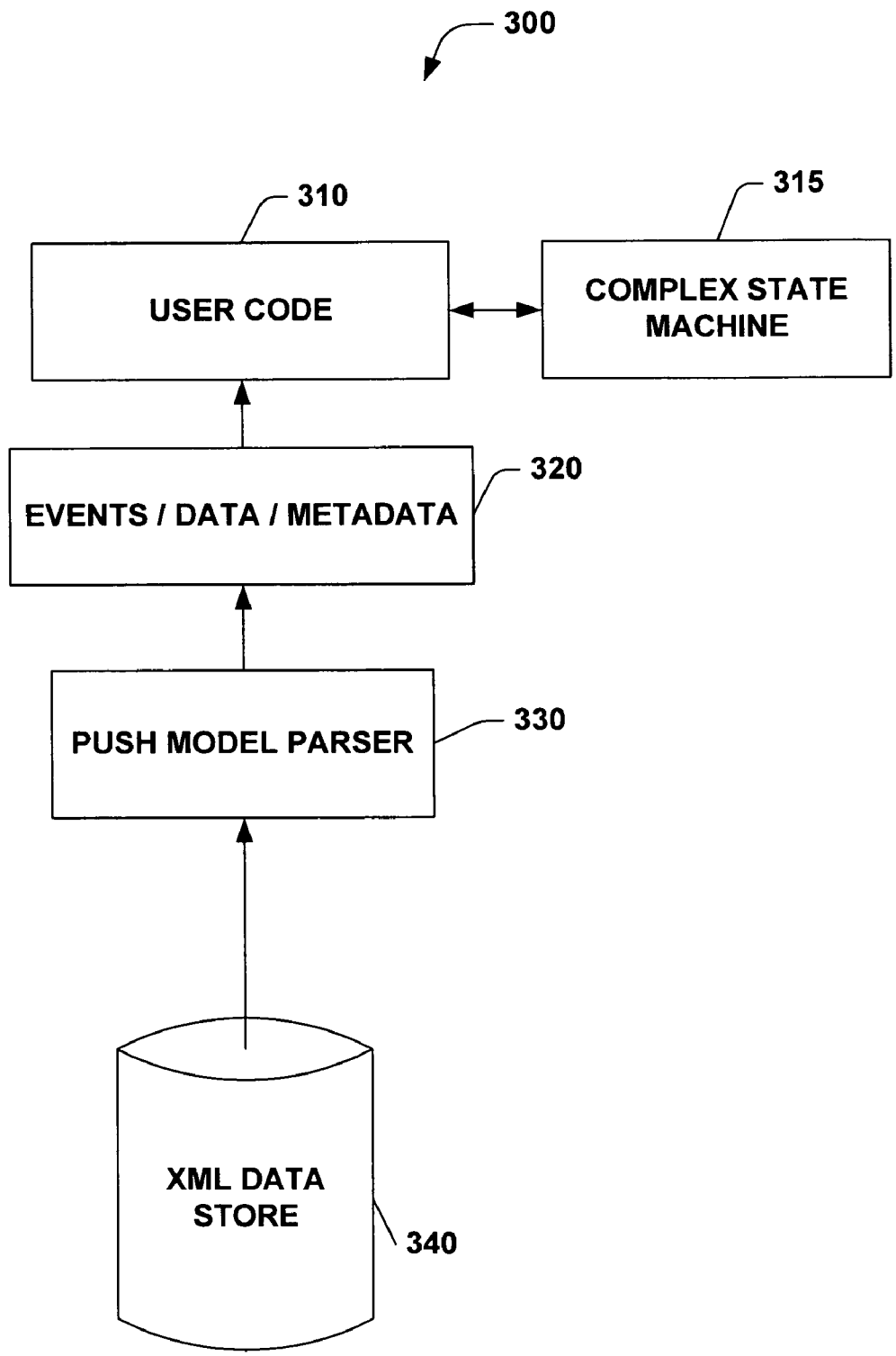
FIG. 3 is a schematic block diagram illustrating a conventional push model parser.

Prior Art FIG. 3 is a schematic block diagram illustrating a system 300 for parsing XML that employs a conventional push model parser 330. Typically, XML parsers (e.g., SAX) have been push model parsers that retrieve an entire XML document from an XML data store 340 and parse substantially all of the XML document. Push model parsers typically depend on an XML document being fully loaded into memory before parsing. Furthermore, conventional parsers typically parse then write the entire parsed output, events associated with the parsing (e.g., encountered elements, encountered attributes, encountered comments, encountered white space, etc.) and information (e.g., state, attributes) associated with the events. Pushing substantially all of the parsed data, events and metadata 320 produces problems including, but not limited to, requiring the receiver of the parsed data to maintain a complicated state machine 315, transforming unneeded data, consuming excessive memory, consuming excessive processor cycles and limiting the flexibility with which the output destination can request parsed data.

In the conventional system 300, the user code 310 is typically an event driven program that receives event notifications from the push model parser 330 along with a set of data 320 concerning the event. One drawback with the conventional system 300 is that the user code 310 will receive substantially all event notifications and substantially all the metadata associated with such events, even if the user code 310 is not interested in such events. Thus, these irrelevant event notifications may require unnecessary processing by the user program 310 that may only be interested in a subset of events. Furthermore, the user program 310 may be required to maintain a more complicated state machine 315 than is necessary in order to handle events in which the user code 310 is not interested.

Since the conventional push model parser 330 interacts with an event driven user program 310, where the event driven user program 310 is required to maintain a complicated state machine 315, such user code 310 and push model parser 330 typically only interact with a single XML data store 340. Thus, parsing flexibility is limited in the conventional system 300.

Figure 4:
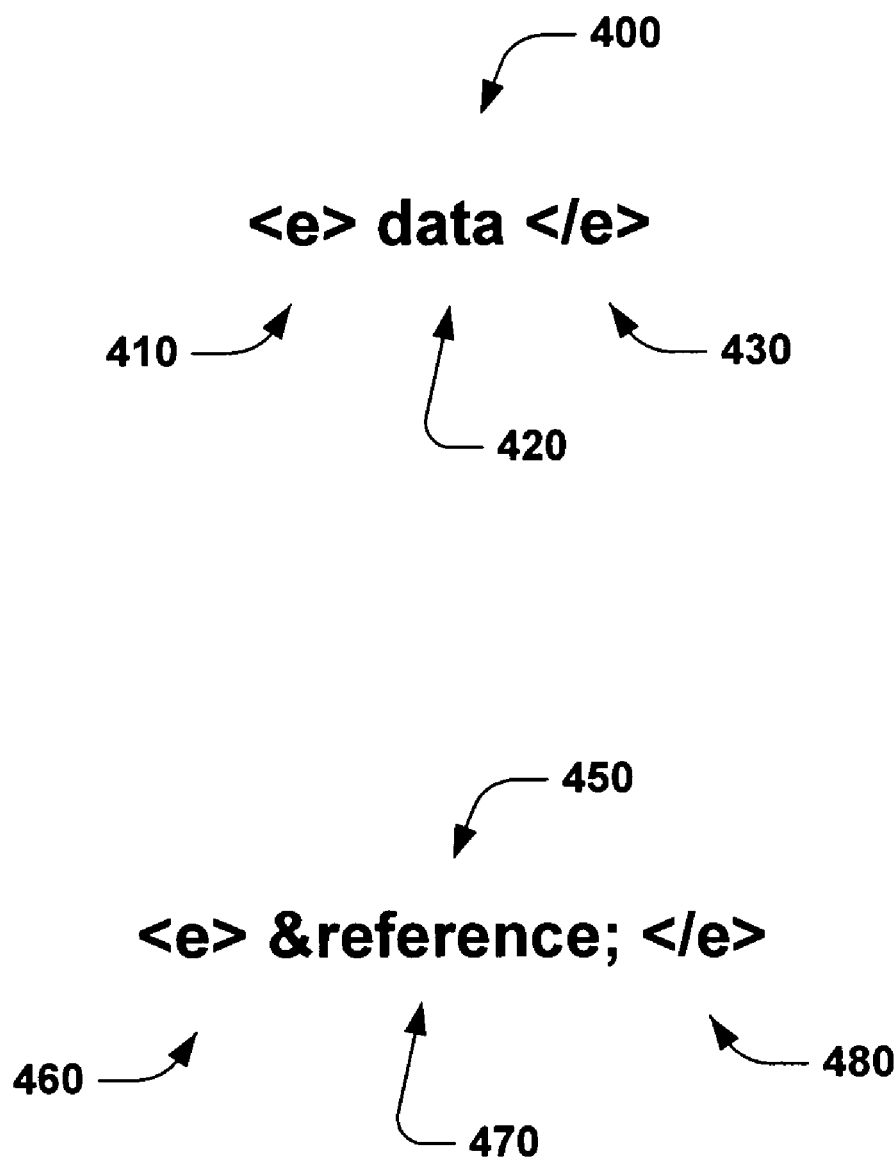
FIG. 4 illustrates example XML entities that may be parsed, in accordance with an aspect of the present invention.

FIG. 4 illustrates example XML elements being parsed. An element 400 includes a start token 410, a data 420 and an end token 430. A pull model XML parser can be programmed, for example, to selectively parse out the start token 410 and pass an event to a user program but to not pass metadata associated with the start token 410 to a user program, to parse out the data 420 and present the data and associated metadata to a user program and to parse out the end token 430 and not pass metadata associated with the end token 430 to the user program. Thus, by being programmable to facilitate selectively passing events, data and/or metadata concerning parsed entities, the pull model parser can reduce memory requirements and processor requirements.

FIG. 4 also illustrates an element 450 that includes an entity reference. Such references may be internal and/or external. Such references may refer to items including, but not limited to, DTDs (Document Type Declarations), external data representations, XML documents and/or schema. The element 450 includes a start token 460, an entity reference 470 and an end token 480. A pull model parser can be programmed, for example, to selectively parse out the start token, to parse (either expanding or not expanding) the entity reference 470 and to pass an event, data and metadata concerning the entity reference 470 to a user program and to parse out the end token 480. In conventional push model parsers, substantially all of the events, data and metadata associated with expanding the entity reference would be passed to a user program. Thus, a user program may be burdened with data, events and metadata that it considers irrelevant. By way of illustration, a user program may only be interested in determining whether an XML document contains an external reference and if so, how many external references are included in the XML document. Conventionally, such a user program would be required to parse substantially all of an XML document, which would include expanding the entity references and parsing the referred to XML data, to achieve its goal. Thus, a pull model parser that can be programmed to selectively expand and/or not expand an entity reference, either internal and/or external, and to selectively pass data, events and/or metadata to a consumer of the pull model parser provides efficiency advantages over conventional systems.

Figure 5:
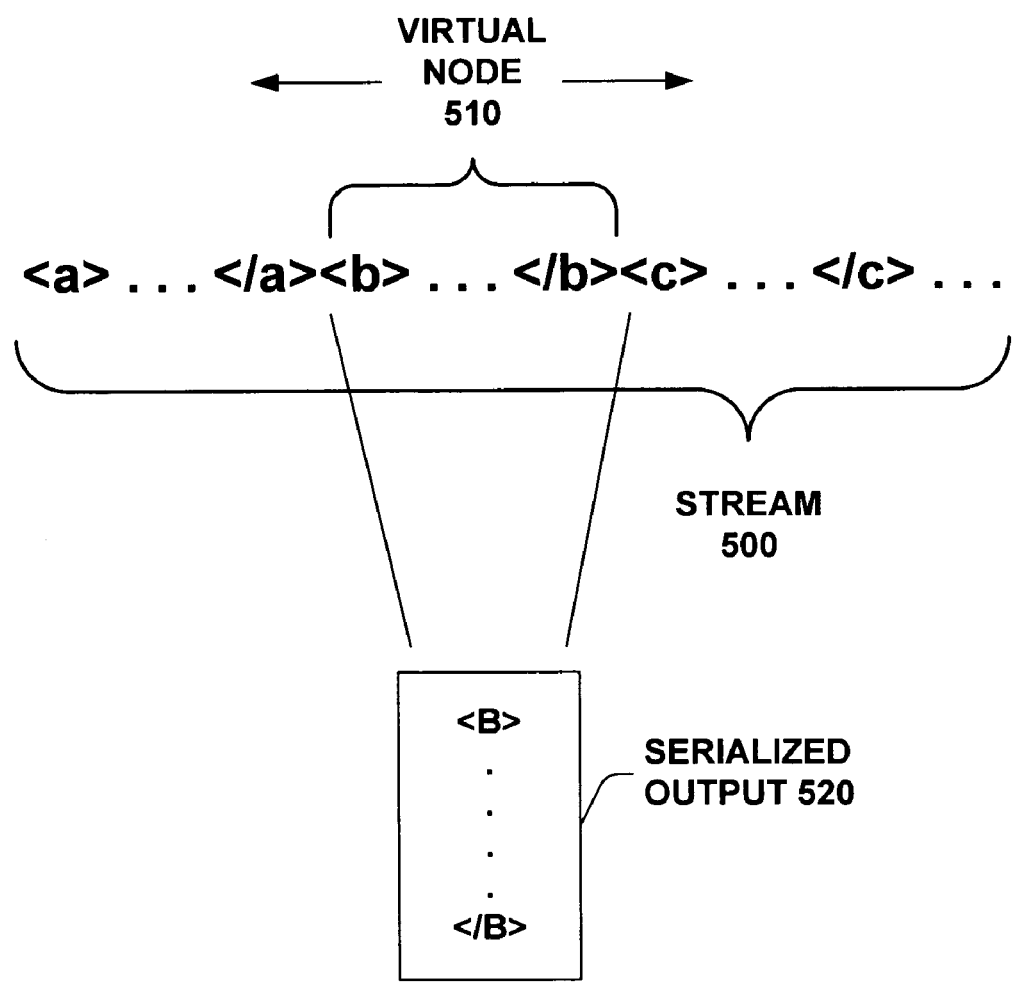
FIG. 5 illustrates a virtual node being passed over a stream of XML nodes in accordance with an aspect of the present invention.

FIG. 5 illustrates a virtual node 510 being passed over a stream 500 of XML nodes to facilitate producing a serialized output 520 of parsed XML items. The virtual node 510 can be navigated forward and/or backward in the stream, which facilitates selectively pulling a desired node from the stream 500. The ability to navigate the virtual node 510 in the stream 500 facilitates reducing the amount of serialized output 520 to which a parse requestor will be exposed and further facilitates dynamically selecting a node to pull from the stream 500.

In one example of the present invention, a parse requestor may establish state associated with parsing in a manner that will facilitate a pull model parser ignoring selected node types and/or selected portions of a node. By way of illustration, and not limitation, in FIG. 5, the node <a> . . . </a> may be of interest to a parse requestor and thus state may be established so that when the virtual node 510 passes over the node <a> . . . </a> the virtual node 510 will selectively pull that node and parse that node. By way of further illustration, the node <b> . . . </b> may not be of interest to a parse requestor and thus state may be established so that when the virtual node 510 passes over the node <b> . . . </b> the virtual node 510 will not pull the node. By way of still further illustration, the existence of the node <c> . . . </c> may be of interest to a parse requestor, but the parse requestor may not be interested in the contents of the node <c> . . . </c>. Thus, state may be established so that when the virtual node 510 passes over the node <c> . . . </c> that an event related to the existence of the node is generated but the node is not pulled or parsed. While three nodes are illustrated in FIG. 5, it is to be appreciated that the virtual node 510 may pass over a greater and/or lesser number of nodes in accordance with the present invention. Types of nodes over which the virtual node 510 may pass include, but are not limited to, element nodes, white space nodes, significant white space nodes, end element nodes, text nodes, CDATA nodes, entity nodes, processing instruction nodes, entity reference nodes, XML declaration nodes, attribute nodes, end entity nodes and normalization nodes, for example.

Figure 6:
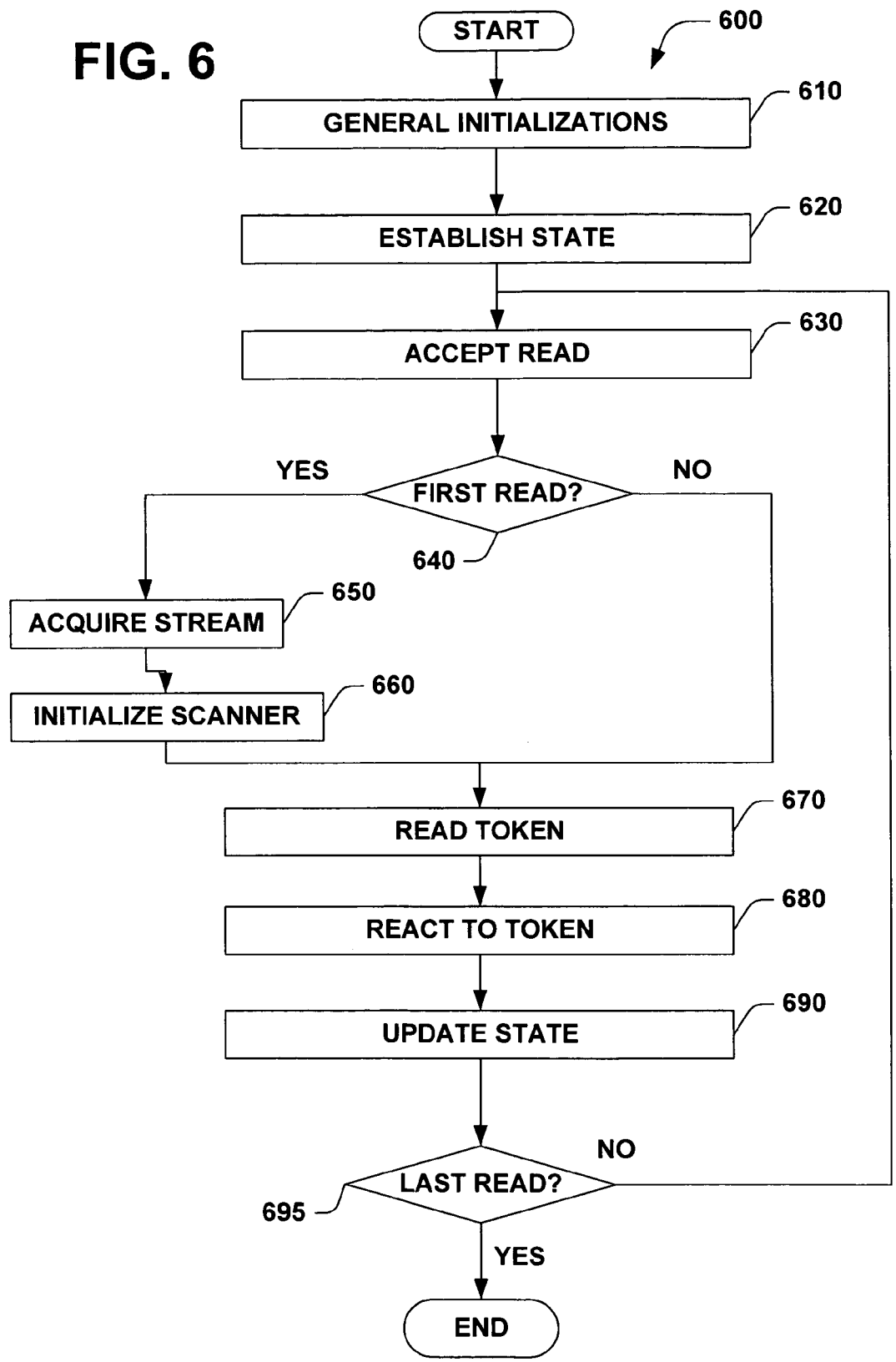
FIG. 6 is a flowchart illustrating a method for parsing XML items that employs a pull model parser, in accordance with an aspect of the present invention.

In view of the exemplary systems shown and described above, methodologies that may be implemented in accordance with the present invention will be better appreciated with reference to the flow chart of FIG. 6. While, for purposes of simplicity of explanation, the methodologies are shown and described as a series of blocks, it is to be understood and appreciated that the present invention is not limited by the order of the blocks, as some blocks can, in accordance with the present invention, occur in different orders and/or concurrently with other blocks from that shown and described herein. Moreover, not all illustrated blocks may be required to implement a methodology in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules can be combined or distributed as desired in various embodiments. Furthermore, computer executable instructions operable to perform the methods described herein can be stored on computer readable media.

FIG. 6 illustrates a method 600 for parsing XML that employs a pull model parser. At 610 general initializations occur. Such initializations include, but are not limited to, allocating memory, establishing pointers, establishing data communications, acquiring resources, instantiating objects, and setting initial values for variables. The initializations can include instantiating a pull model parser object by, for example, determining a desired association with a filename, stream and/or text reader.

At 620, state is established. Such state may be employed, for example, to track items including, but not limited to, the location in an XML document to which parsing has progressed, the type of nodes that have been encountered, the number of nodes that have been encountered, the type of tokens that have been encountered, whether a desired point in parsing has been reached and whether a desired value has been retrieved. The state may also be employed in processing associated with default white space handling, encoding, base URI and default name space handling, for example.

At 630, a read (e.g., a request to pull and parse an XML item) is received. At 640, a determination is made concerning whether this is the first read accepted by the method 600. If the determination at 640 is YES, then at 650 a stream is associated with the pull model parsing. Since the ability to navigate within a stream can be beneficial to the present invention, in one example of the present invention, at 660, a scanner that is adapted to facilitate navigation within a stream is initialized and associated with the stream of 650.

At 670, a token is read from the stream. The token may be, for example, a start token. At 680 the method reacts to the token. By way of illustration, if a token is received in which the method 600 is not interested, then the token may be ignored. But if the token is one in which the method 600 is interested, then the token may be pulled from the stream and serialized into a parsed output. Since the method 600 established a state at 620 and since the action(s) that are taken at 680 may depend, at least in part, on the state, at 690 the state may be updated based on the token that was read at 670 and the action that was taken at 680. For example, if the state indicated that an end token was required to complete the parsing of an element and such end token was received and reacted to, then the state machine may be updated to reflect that the entity has been parsed and thus a new state can be established (e.g., waiting for start token).

At 695 a determination is made concerning whether the read of 630 was the last read from a parse requestor. If the determination at 695 is NO, then processing can return to 630, otherwise processing can conclude. Concluding the processing may involve actions including, but not limited to, closing a stream, dissolving an association with an input source and de-establishing state, for example.

It is to be appreciated that the read(s) at 630 may be employed to selectively pull and parse XML items from a stream. Conventionally, a push model parser would parse substantially all of an XML item and push substantially all of the parsed data, events associated with the parsed data and metadata associated with the parsed data to a parse requestor. But the method 600, through the accept read block 630, facilitates a parse requestor receiving a more precise output from the pull model parser, thus mitigating problems associated with excessive memory requirements and/or excessive processing.

FIG. 7 illustrates a graph 700 associated generic state machine and a graph 750 associated with an example state machine employed in a pull model parser. The graph 700 illustrates a state machine that has eight states and seven possible state transitions between the eight states. For example, from a first state A 710, state may transition to one of three second states B 720, C 722 and D 724. State machines are well known in the art and thus extensive discussion thereof is omitted herein for brevity. The graph 750 illustrates a fragment of a state machine for a pull model XML parser. In the portion of the illustrated state machine, a node 760 represents a state where an open angle bracket "<" has been encountered. The state machine may then transition to one of three sample states. A first target state is represented by a node 770 to which the state would transition if a name were next encountered. Similarly, the state machine may transition to a node 772 if a "!" were encountered and to a node 774 if a "?" were encountered. Although state machines are known in the art, the present invention facilitates a pull-model XML parser user interacting with a simpler state machine. For example, if the parse user was not interested in events associated with node 772 (e.g., the "!"), then the pull model parser could be programmed to ignore such characters and not present events, data and/or metadata associated with such a character to the parser user and thus the state machine could be simplified because it would not have to deal with such data, events and/or metadata. While the graph 750 illustrates eight states and seven state transitions, it is to be appreciated that state machines with a greater and/or lesser number of states and/or transitions can be employed in accordance with the present invention.

Figure 8:
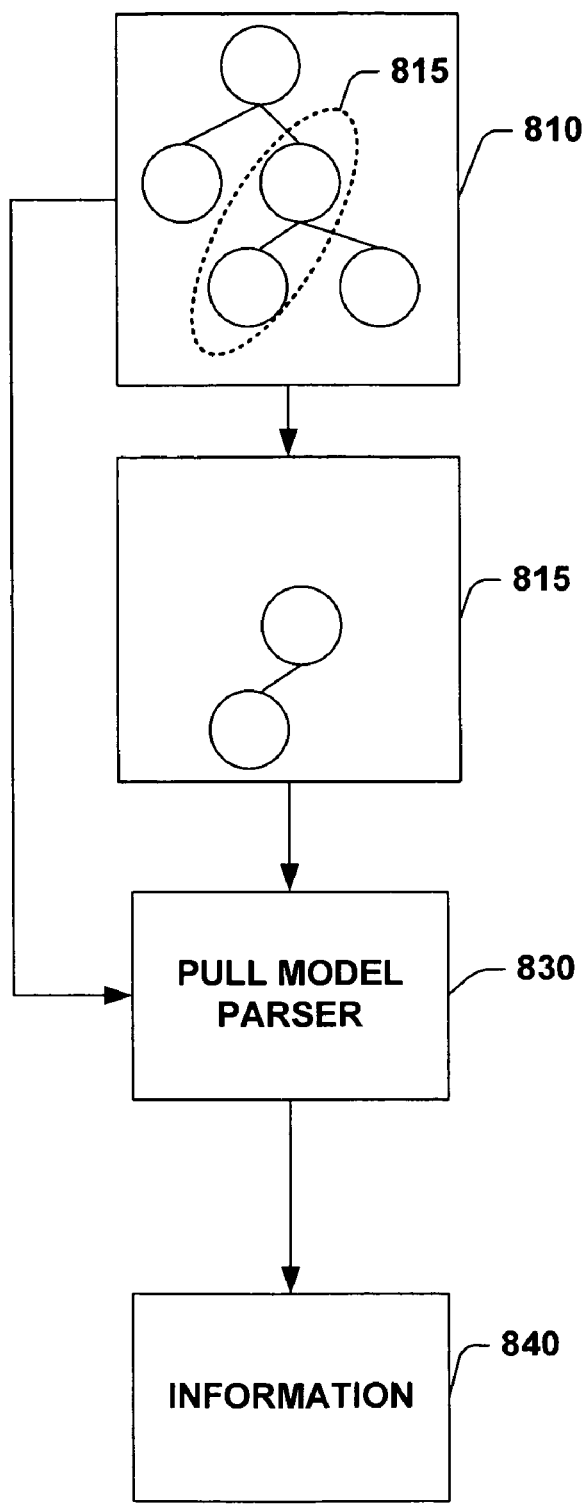
FIG. 8 illustrates a pull model parser being employed to parse a fragment of an XML document, in accordance with an aspect of the present invention.

FIG. 8 illustrates a pull model parser 830 being employed to parse a fragment 815 of an XML document 810. Conventionally, a push model parser would parse substantially all of the XML document 810 even if the parse requester was only interested in the fragment 815. The pull model parser 830 is adapted to facilitate identifying the fragment 815 of the XML document 810 and to navigate within a stream associated with the XML document 810 to selectively pull and parse the fragment 815. Thus, the pull model parser facilitates reducing processing associated with accessing a subset of an XML document, with corresponding reductions in memory and/or processor requirements.

Parsing XML, and in particular parsing the fragment 815 can produce parsed data, metadata associated with the parsed data and in event-driven models events associated with parsing the fragment. In one example of the pull model parser 830, information 840 that is retrieved from the pull model parser 830 can include, but is not limited to, a subset of the parsed data, a subset of the metadata and a subset of the events. Thus, the pull model parser 830 facilitates reducing processing for consumers of the information 840. The information may include, for example, data concerning whether the fragment 815 is well-formed, data concerning whether the fragment is valid and data associated with one or more values in the fragment 815.

FIG. 9 illustrates the result of parsing, in two sample modes, an XML entity that contains an external entity reference. The two sample modes are an entity expanding mode and an entity non-expanding mode. A first XML entity 900 includes a start tag 910, a reference character 920, a reference content 930 and an end tag 940. A second XML entity 950 includes a start tag 960, a content 970 and an end tag 980.

In parsing the entity 900 without expanding the entity reference, the serialized output illustrated in the "not expanded" box 995 would be produced. Thus, the parse requestor is presented with the start tag 910, the start tag 960, the content 970, the end tag 980 and the end tag 940. But in parsing the entity 900 and expanding the entity reference, both the referencing entity 900 and the referenced entity 950 would be expanded and thus the parse requestor is presented with the start tag 910, the reference character 920, the content 930, the start character 960, the content 970, the end tag 980 and the end tag 940. Conventionally, push model parsers may not present a parse requestor with the option to expand or not expand entity references, and thus the present invention provides flexibility advantages over such conventional systems.

Figure 10:
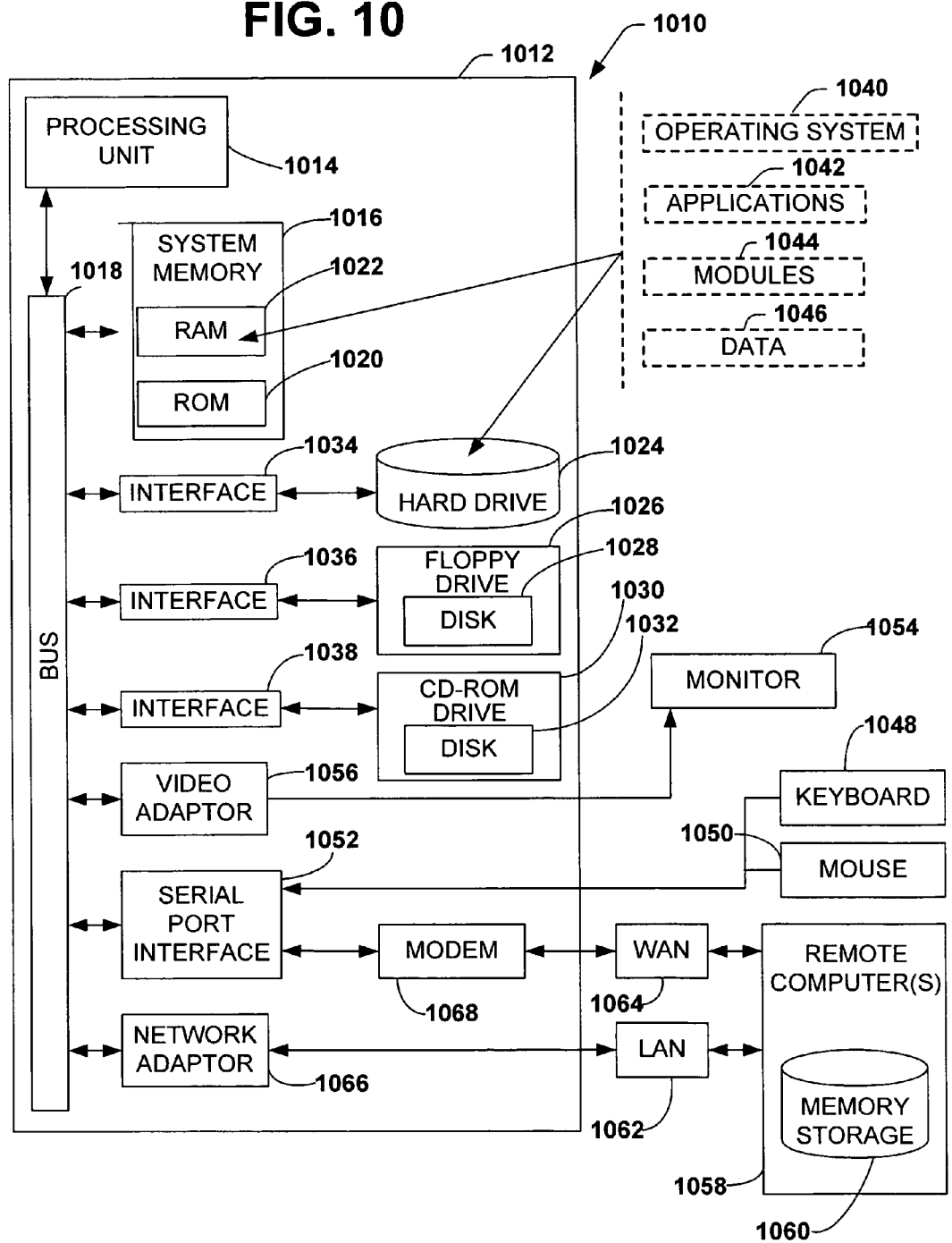
FIG. 10 is a schematic block diagram of an exemplary operating environment for a system configured in accordance with the present invention.

In order to provide additional context for various aspects of the present invention, FIG. 10 and the following discussion are intended to provide a brief, general description of one possible suitable computing environment 1010 in which the various aspects of the present invention may be implemented. It is to be appreciated that the computing environment 1010 is but one possible computing environment and is not intended to limit the computing environments with which the present invention can be employed. While the invention has been described above in the general context of computer-executable instructions that may run on one or more computers, it is to be recognized that the invention also may be implemented in combination with other program modules and/or as a combination of hardware and software. Generally, program modules include routines, programs, components, data structures, etc. that perform particular tasks or implement particular abstract data types. Moreover, one will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

FIG. 10 illustrates one possible hardware configuration to support the systems and methods described herein. It is to be appreciated that although a standalone architecture is illustrated, that any suitable computing environment can be employed in accordance with the present invention. For example, computing architectures including, but not limited to, stand alone, multiprocessor, distributed, client/server, minicomputer, mainframe, supercomputer, digital and analog can be employed in accordance with the present invention.

With reference to FIG. 10, an exemplary environment 1010 for implementing various aspects of the invention includes a computer 1012, including a processing unit 1014, a system memory 1016, and a system bus 1018 that couples various system components including the system memory to the processing unit 1014. The processing unit 1014 may be any of various commercially available processors. Dual microprocessors and other multi-processor architectures also can be used as the processing unit 1014.

The system bus 1018 may be any of several types of bus structure including a memory bus or memory controller, a peripheral bus, and a local bus using any of a variety of commercially available bus architectures. The computer memory 1016 includes read only memory (ROM) 1020 and random access memory (RAM) 1022. A basic input/output system (BIOS), containing the basic routines that help to transfer information between elements within the computer 1012, such as during start-up, is stored in ROM 1020.

The computer 1012 may further include a hard disk drive 1024, a magnetic disk drive 1026, e.g., to read from or write to a removable disk 1028, and an optical disk drive 1030, e.g., for reading a CD-ROM disk 1032 or to read from or write to other optical media. The hard disk drive 1024, magnetic disk drive 1026, and optical disk drive 1030 are connected to the system bus 1018 by a hard disk drive interface 1034, a magnetic disk drive interface 1036, and an optical drive interface 1038, respectively. The computer 1012 typically includes at least some form of computer readable media. Computer readable media can be any available media that can be accessed by the computer 1012. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer 1012. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

A number of program modules may be stored in the drives and RAM 1022, including an operating system 1040, one or more application programs 1042, other program modules 1044, and program non-interrupt data 1046. The operating system 1040 in the computer 1012 can be any of a number of commercially available operating systems.

A user may enter commands and information into the computer 1012 through a keyboard 1048 and a pointing device, such as a mouse 1050. Other input devices (not shown) may include a microphone, an IR remote control, a joystick, a game pad, a satellite dish, a scanner, or the like. These and other input devices are often connected to the processing unit 1014 through a serial port interface 1052 that is coupled to the system bus 1018, but may be connected by other interfaces, such as a parallel port, a game port, a universal serial bus ("USB"), an IR interface, etc. A monitor 1054, or other type of display device, is also connected to the system bus 1018 via an interface, such as a video adapter 1056. In addition to the monitor, a computer typically includes other peripheral output devices (not shown), such as speakers, printers etc.

The computer 1012 may operate in a networked environment using logical and/or physical connections to one or more remote computers, such as a remote computer(s) 1058. The remote computer(s) 1058 may be a workstation, a server computer, a router, a personal computer, microprocessor based entertainment appliance, a peer device or other common network node, and typically includes many or all of the elements described relative to the computer 1012, although, for purposes of brevity, only a memory storage device 1060 is illustrated. The logical connections depicted include a local area network (LAN) 1062 and a wide area network (WAN) 1064. Such networking environments are commonplace in offices, enterprise-wide computer networks, intranets and the Internet.

When used in a LAN networking environment, the computer 1012 is connected to the local network 1062 through a network interface or adapter 1066. When used in a WAN networking environment, the computer 1012 typically includes a modem 1068, or is connected to a communications server on the LAN, or has other means for establishing communications over the WAN 1064, such as the Internet. The modem 1068, which may be internal or external, is connected to the system bus 1018 via the serial port interface 1052. In a networked environment, program modules depicted relative to the computer 1012, or portions thereof, may be stored in the remote memory storage device 1060. It will be appreciated that the network connections shown are exemplary and other means of establishing a communications link between the computers may be used.

Figure 11:
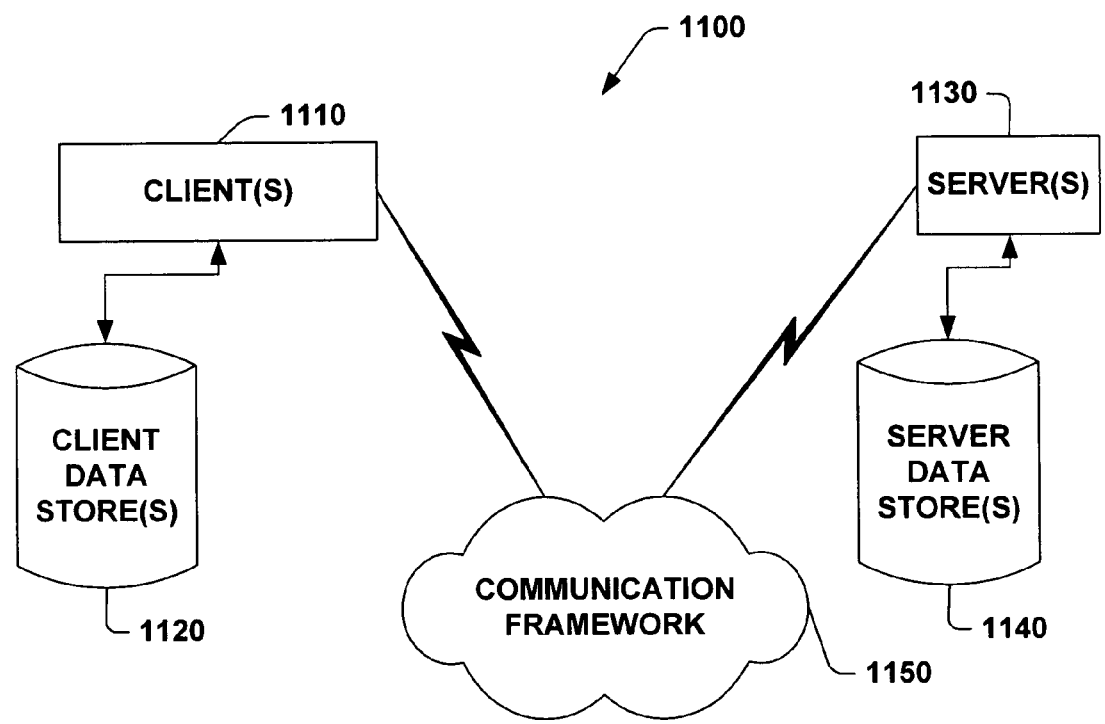
FIG. 11 is a schematic block diagram of an exemplary communication environment for a method performing in accordance with the present invention.

FIG. 11 is a schematic block diagram of a sample computing environment 1100 with which the present invention can interact. The system 1100 includes one or more clients 1110. The clients 1110 can be hardware and/or software (e.g., threads, processes, computing devices). The clients 1110 can house threads that desire to pull and parse XML items by employing the present invention, for example. The system 1100 also includes one or more servers 1130. The servers 1130 can also be hardware and/or software (e.g., threads, processes, computing devices). The servers 1130 can house threads to perform transformations by employing the present invention, for example. One possible communication between a client 1100 and a server 1130 may be in the form of a data packet adapted to be transmitted between two or more computer processes. The data packet may include a first field that holds a pulled XML item and a second field that holds metadata information associated with the pulled XML item, for example. The system 1100 includes a communication framework 1150 that can be employed to facilitate communications between the clients 1110 and the servers 1130. Such a communication framework may house remoting features and/or a thread pool, for example that facilitate client/server XML parsing processing, for example. The clients 1110 are operably connected to one or more client data stores 1115 that can be employed to store information local to the clients 1110 (e.g., XML input items). Similarly, the servers 1130 are operably connected to one or more server data stores 1140 that can be employed to store information local to the servers 1130 (e.g., output destination information).

Figure 12:
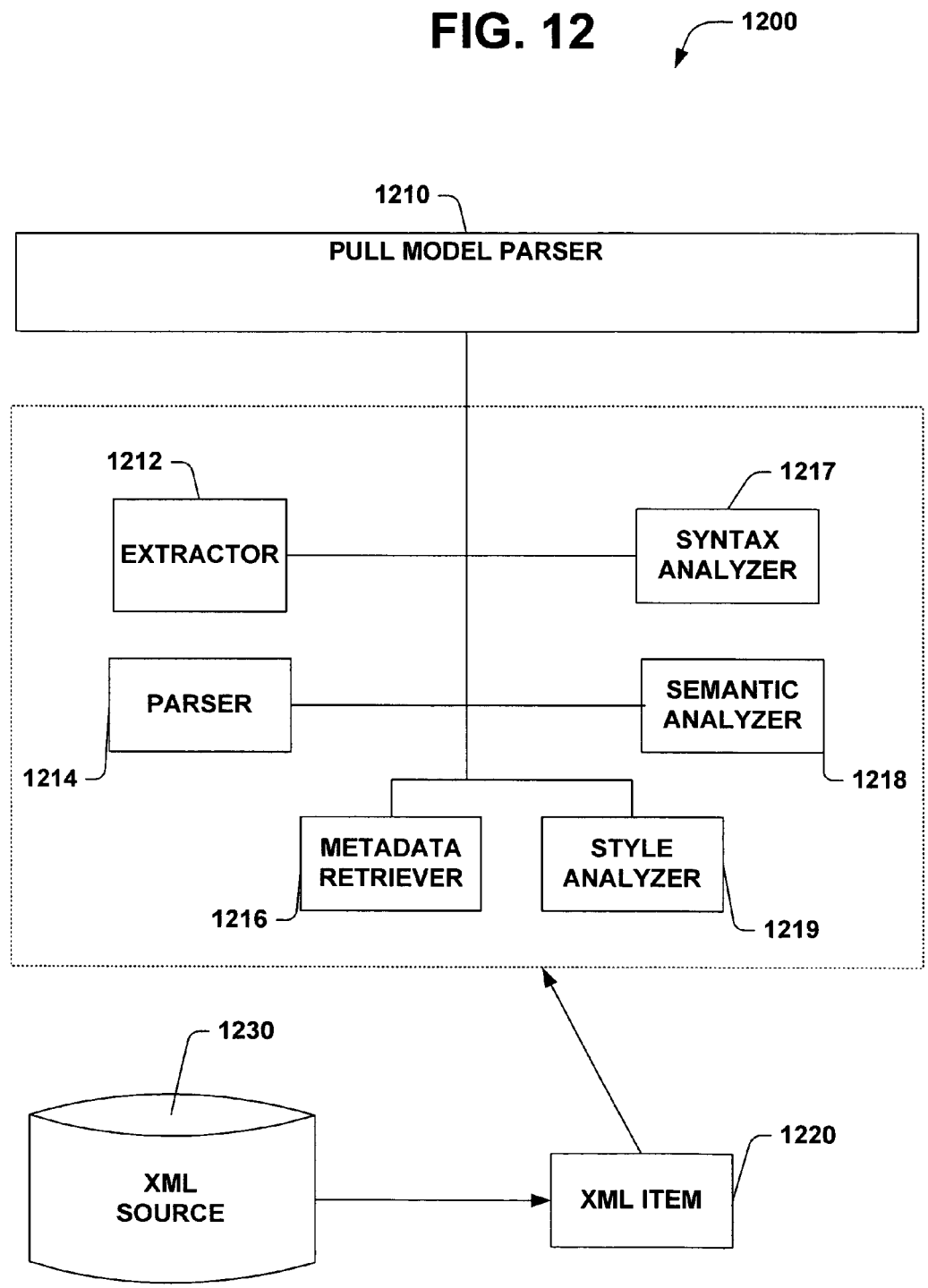
FIG. 12 is a schematic block diagram illustrating a system for parsing XML items using a pull model parser, in accordance with an aspect of the present invention.

FIG. 12 illustrates a system 1200 for parsing XML items using a pull model parser 1210. The system 1200 includes an extractor 1212 adapted to pull an XML item 1220 from an XML source 1230 and a parser 1214 adapted to selectively parse the XML item 1220 into sub-items. The sub-items can include, but are not limited to a start token, an end token, markup, content, an entity reference, an external reference, an element, a tag, character data, an attribute, a CDATA section, a comment and a processing instruction.

In one example of the present invention, the system 1200 includes a metadata retriever 1216 adapted to retrieve information associated with the pulled XML item 1220. Such metadata may include, but is not limited to, a namespace name, a local name, a prefix, an unordered set of attributes, and an ordered list of children.

Another example of the system 1200 can include a syntax analyzer 1217 that can be employed to determine whether the pulled XML item 1220 conforms to XML syntax. Such determination can be made, for example, by reference to syntax documents (e.g., W3C XML syntax documents). Yet another example of the system 1200 includes a semantic analyzer 1218 that can be employed to determine whether the pulled XML item 1220 conforms to XML semantics. Such determination can be made, for example, by reference to semantic related documents (e.g., style sheet, DTD, schema). Still another example of the system 1200 can include a style analyzer 1219 adapted to determine whether the pulled XML item 1220 conforms to a selected style sheet. While the extractor 1212, the parser 1214, the metadata retriever 1216, the syntax analyzer 1217, the semantic analyzer 1218 and the style analyzer 1219 are illustrated as separate components that form the pull model parser 1210, it is to be appreciated that the pull model parser 1210 may be formed from a subset of the extractor 1212, the parser 1214, the metadata retriever 1216, the syntax analyzer 1217, the semantic analyzer 1218 and the style analyzer 1219 and that the extractor 1212, the parser 1214, the metadata retriever 1216, the syntax analyzer 1217, the semantic analyzer 1218 and the style analyzer 1219 may be standalone components and/or co-operating components housed in one or more processes, threads and/or computers, for example.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for parsing XML, the system comprising at least a processor executing the following components:
    an extractor that pulls an XML item from an input source, the extractor operates a virtual node that navigates forward or backward in a stream of XML nodes thereby facilitating selective pulling of at least one XML node;
    a parser that selectively parses the at least one XML node selectively pulled from the XML item into one or more sub-items comprising one or more of a start token, an end token or a data element based on an input from a user code.

2. The system of claim 1, the data element comprises, content, an entity reference, an external reference, an element, a tag, character data, an attribute, a CDATA section, a comment or a processing instruction.

3. The system of claim 1, further comprising a metadata retriever that retrieves information associated with the pulled XML item.

4. The system of claim 3, the information associated with the pulled XML item comprises at least one of a namespace name, a local name, a prefix, an unordered set of attributes, or an ordered list of children.

5. The system of claim 3, further comprising a syntax analyzer that determines whether the pulled XML item conforms to a desired XML syntax.

6. The system of claim 5, the syntax analyzer references syntax documents.

7. The system of claim 5, further comprising a semantic analyzer that determines whether the pulled XML item conforms to a desired XML semantic.

8. The system of claim 7, further comprising a style analyzer that determines whether the pulled XML item conforms to a desired style sheet.

9. The system of claim 7, further comprising a pull model parser comprising a subset of the extractor, the parser, the metadata retriever, a syntax analyzer, the semantic analyzer and a style analyzer.

10. The system of claim 9, the extractor, the parser, the metadata retriever, the syntax analyzer, the semantic analyzer and the style analyzer are stand alone units.

11. The system of claim 1, further comprising a parse requestor that establishes a state associated with the selective parsing that facilitates the pull model parser ignoring selected portions of the XML node.

12. A method for parsing XML, the method comprising:
    pulling an XML item from computer readable storage medium;
    selectively pulling at least on XML node from the XML item; and
    selectively parsing the pulled XML node into one or more sub-items based on an input from a user code, the sub-items comprising one or more of a start token, an end token or a data element.

13. The method of claim 12, the data element comprises, content, an entity reference, an external reference, an element, a tag, character data, an attribute, a CDATA section, a comment a processing instruction.

14. The method of claim 13, further comprising retrieving metadata information associated with the pulled XML item.

15. The method of claim 14, the metadata information associated with the pulled XML item comprises at least one of a namespace name, a local name, a prefix, an unordered set of attributes, and an ordered list of children.

16. The method of claim 14, further comprising analyzing syntax associated with the pulled XML item to determine whether the syntax conforms to a desired XML syntax.

17. The method of claim 16, further comprising analyzing semantics associated with the pulled XML item to determine whether the semantics conform to a desired XML semantics.

18. The method of claim 17, further comprising analyzing the style of the pulled XML item to determine whether the pulled XML item conforms to a selected style sheet.

19. The method of claim 12, further comprising checking the pulled XML item to determine if it is valid.

20. A computer readable storage medium storing computer executable components of a system for parsing XML, the system comprising:
    a component for locating an XML token that identifies at least one XML item;
    a component for selectively pulling the XML item;
    a component for parsing at least one node selected from the pulled XML item;
    a component for retrieving metadata associated with the pulled XML item;
    a component for verifying whether the pulled XML item is well-formed; and
    a component for verifying whether the pulled XML item is valid.

* * * * *